United States Patent
Tatarek

(10) Patent No.: US 9,022,347 B2
(45) Date of Patent: May 5, 2015

(54) DISC COMPONENT FOR GAS CONTROL VALVES

(75) Inventor: Andrew Tatarek, Hampshire (GB)

(73) Assignee: Concept 2 Manufacture Design OCD Ltd, Aldershot, Hampshire (GB)

(*) Notice: Subject to any disclaimer, the term of this patent is extended or adjusted under 35 U.S.C. 154(b) by 1297 days.

(21) Appl. No.: 12/450,519

(22) PCT Filed: Mar. 31, 2008

(86) PCT No.: PCT/GB2008/050234
§ 371 (c)(1),
(2), (4) Date: Jan. 15, 2010

(87) PCT Pub. No.: WO2008/120021
PCT Pub. Date: Oct. 9, 2008

(65) Prior Publication Data
US 2010/0108920 A1    May 6, 2010

(30) Foreign Application Priority Data

Mar. 30, 2007  (GB) .................... 0706240.9

(51) Int. Cl.
*F16K 31/00*    (2006.01)
*F16K 41/10*    (2006.01)
(Continued)

(52) U.S. Cl.
CPC ......... *F16K 41/103* (2013.01); *B29C 45/14311* (2013.01); *B29C 45/1459* (2013.01); *B29K 2083/00* (2013.01); *B29K 2221/003* (2013.01); *B29K 2705/00* (2013.01); *F16K 7/12* (2013.01); *F16K 25/005* (2013.01)

(58) Field of Classification Search
CPC ............ F04B 43/0054; F16J 3/02; F16K 7/12
USPC ............ 251/331, 332.5, 30.01–30.04, 40, 45, 251/46, 61; 92/99, 100, 98 D, 103 F, 90, 96, 92/98 R, 103 R; 29/890.127; 264/250, 264/279.1, 274–276
See application file for complete search history.

(56) References Cited

U.S. PATENT DOCUMENTS 4,327,891 A * 5/1982 Allen et al. ................ 251/38
4,980,109 A * 12/1990 Yamamoto et al. ........... 264/135
(Continued)

FOREIGN PATENT DOCUMENTS

DE    297 03 629    5/1997
EP    0 606 098    7/1994
(Continued)

OTHER PUBLICATIONS

UK Search Report, Application No. GB0706240.9, Search date: Jan. 26, 2008, 1 page.

*Primary Examiner* — Marina Tietjen
(74) *Attorney, Agent, or Firm* — Drinker Biddle & Reath LLP

(57) ABSTRACT

A disc for use in a pneumatic valve includes a stiffening insert encased in a flexible body. The stiffening insert acts to protect a central actuation region of the disc against radial compression, which may arise if the disc is used to seal against a bore hole, and against material flow towards the actuation region away from a clamped periphery. The behavior of the disc in a valve assembly is therefore more predictable and reproducible. The flexible body may further be tensioned across the stiffening insert.

24 Claims, 6 Drawing Sheets

(51) Int. Cl.
  *B29C 45/14* (2006.01)
  *F16K 7/12* (2006.01)
  *F16K 25/00* (2006.01)
  *B29K 83/00* (2006.01)
  *B29K 221/00* (2006.01)
  *B29K 705/00* (2006.01)

(56) References Cited

U.S. PATENT DOCUMENTS

| | | | |
|---|---|---|---|
| 5,360,000 | A | 11/1994 | Carter |
| 6,086,039 | A | 7/2000 | Sievers et al. |
| 6,484,721 | B1 | 11/2002 | Bliss |
| 6,616,119 | B2 * | 9/2003 | Wilson ............... 251/40 |
| 7,739,915 | B2 * | 6/2010 | Pantier et al. ............... 73/715 |
| 2003/0036598 | A1 * | 2/2003 | Yamasa et al. ............... 524/495 |
| 2004/0244797 | A1 | 12/2004 | Jackson |
| 2006/0081807 | A1 * | 4/2006 | Browne et al. ............... 251/331 |
| 2006/0289824 | A1 * | 12/2006 | Wincek ............... 251/331 |
| 2012/0200047 | A1 * | 8/2012 | Goulding ............... 277/654 |

FOREIGN PATENT DOCUMENTS

| | | |
|---|---|---|
| EP | 0 882 921 | 12/1998 |
| GB | 907454 | 10/1962 |
| GB | 1011970 | 12/1965 |
| GB | 1267920 | 3/1972 |
| JP | 62-127571 | 6/1987 |
| JP | 2-72272 | 3/1990 |

* cited by examiner

14 →

17 →

18 →

DISC COMPONENT FOR GAS CONTROL VALVES

This invention relates to the field of control valves and, in particular, to pneumatic valves with a timing function and those designed to respond proportionally to pressure.

BACKGROUND

Pneumatic servo or pilot-actuated control valves have a variety of applications. Those designed for square wave regulation may be used for conserving devices (e.g. U.S. Pat. No. 5,360,000 or U.S. Pat. No. 6,484,721), nebulisers and the like or for constructing pneumatic logic circuits. Alternatively, such valves find application in alarm signal generation in which, for example, a constant pressure signal is converted to a pulsed flow for feeding an alerting device, such as a whistle, to provide a pulsed alarm. Or in resuscitation apparatus in which a constant pressure signal is converted to a pulsed flow of oxygen to the lungs. Valves designed for proportional use may be used in breathing apparatus (e.g. EP 0606098 or US 2004/244797).

These valves employ a component sealed around its periphery, and pressure (control pressure) is used on one side of a central section to effect operation. Increasing pressure results in a force being applied to the central section, which is thereby displaced in order to open or close a valve or to apply a load. Valve actuation is typically on the opposite side to which the pressure is applied.

A piston or diaphragm is conventionally used in a pneumatic valve assembly as the actuation means. A piston valve comprises a moving seal such as an o-ring operating in a bore. Friction inevitably affects such movement however, which will introduce hysteresis into the action of the valve. This renders the piston generally unsuitable for use in servo or pilot-actuated control valves, particularly if a small device size is important.

More common therefore is the diaphragm. Conventionally a rubber disc is secured around its circumference with its central portion forming a seal with a seat on an inlet jet. The valve is opened or closed by flexing the central portion of the disc.

The terms "disc" and "diaphragm" are often used interchangeably in the art. In what follows however, the term "diaphragm" will be used if referring to that part of the disc that flexes against the seat in order to operate the valve. The term "disc" will be retained if referring to the entire component, which is held in the valve assembly about its periphery and flexes at its central (diaphragm) portion.

Two common means of sealing the outside of the disc are employed in control valves of this type. First, the outer perimeter may seal by interference against the inside diameter of a bore. By interference, it is meant that the outer part of the disc is distorted inwards by its fit in the bore and a reaction force radially against the bore holds the disc in place. Secondly, the outer perimeter may be clamped between two surfaces, compressing transversely to the disc, leaving the working part of the disc (including diaphragm) in the bore. The arrangement by which the disc is held and sealed affects the way in which the diaphragm behaves, and the choice of which to adopt may be made according to the intended valve application.

In a typical valve assembly, the disc is located and sealed in a bore, with a control volume on one side and a gas inlet in fluid communication with an outlet on the opposite side. The path between gas inlet and outlet may be either open or closed, depending on the flexing of the diaphragm. In operation, gas is forced in or removed from the control volume to generate a variable control pressure therein (although there may be pressure affecting movement of the diaphragm on both sides). The valve is constructed in such a way that when the control pressure is above a threshold, the device is switched and the path between the inlet and outlet may be closed or, alternatively, opened.

In oxygen conserving devices such as that described in U.S. Pat. No. 5,360,000, the disc is used in such a way that a falling pressure on the control side of the valve can cause the valve to open. A threshold (higher) pressure on the control side will close the valve but such pressure is not reached immediately. The gas inflow rate combined with the size of the control volume set the time taken before the pressure in the control side rises to the threshold level that will close the valve. This arrangement can be used to generate a square pulse of known duration i.e. flow can be on for a fixed time interval, then off. The amplitude of the pulse may also be controlled, for example by a restriction downstream of the valve.

In a proportional control valve, the effective open diameter between the inlet and outlet is decreased in response to rising pressure on the control side and increased in response to rising pressure on the flow side.

As noted above, it is conventional in a valve assembly to clamp the outside perimeter of the disc either transversely between two surfaces or radially within a bore. This permits a seal to be created by the disc i.e. isolates one side of the valve assembly from the other, and holds the periphery stationary leaving the diaphragm free to move during operation. Forces involved in radial compression however will tend to distort the centre of the disc, not just the sealing area providing interference. Moreover, with either sealing method, the fact that the disc is compressed by the clamping causes disc material to flow from the clamped area to the free centre. This causes a distortion or bowing of the disc, which usually extends into the diaphragm area. Most commonly, the diaphragm loses its flatness and adopts a curved, bowed shape. The degree of this bowing, or any other distortion, will vary according to the material and shape of the disc as well as with the level and direction of clamping applied. For example, for the disc described in EP 0606098, the radial compression on the outside of the disc in the assembled valve will cause the centre of the disc to bow, to a level dependent on the tolerances of the bore and the disc.

Regardless of the mechanics by which the disc distorts, the end result is that the distortion or bowing significantly affects operation of the diaphragm in a number of situations. There is uncertainty in the position of the surface of the diaphragm with respect to the seat that it seals. For consistent performance, it is important to ensure that each valve opens and closes at the same threshold pressure. That is, that the response of the central diaphragm area to control pressure is predictable and repeatable. This is particularly significant in valves for which the opening and closing is used to perform a timing function. If the pressure at which a particular valve switches is different, the timing produced for the same volume and bleed flow will vary between valve assemblies. Manufacturing economics require that multiple diaphragms and multiple restrictions can be pre-manufactured to permit mass production of valve assemblies. Differences in performance of either component mean that adjustments will need to be made post-assembly, lengthening considerably the production time. Unfortunately manufacturing tolerances for diaphragms are not below the level for which post-production adjustments are required.

Consistent loading is also important to the predictable function of a proportional type valve.

Clearly the effects of disc distortion or bowing are more significant for smaller discs. Some degree of distortion is inevitable and so to minimise its effect larger discs than required by their application are used, such that the central operable portion is more remote from the area affected by clamping and material flow. However larger discs mean larger valves, which is a distinct disadvantage to portable pneumatic devices.

The significance of the effect of clamping is such that, in practice, normal manufacturing tolerances for moulding the rubber and forming the bore are sufficient to cause significant changes in the behaviour of the sealing area of the disc (diaphragm). For example, a 1% increase in radial or vertical compression can lead to a noticeable difference in bowing. Distortion or bowing may be sufficiently severe that the diaphragm may even be reluctant to shut, or reluctant to open.

Diaphragms for use in pneumatic valves are generally constructed of rubber, although recent developments in thermoplastic elastomer (TPE) technology offer a potential alternative. It is known in the prior art (see, for example, GB 1267920) to include a fabric reinforcing layer within the rubber to strengthen the diaphragm and so to increase its burst strength. This however reduces the diaphragm's flexing ability and hence its sensitivity. The reinforcing layer moreover has limited bearing on the diaphragm's response to compression, and so cannot counteract either the effect of radial sealing or of material flow of the rubber during valve assembly.

There is accordingly a perceived need for a disc component for use in a valve assembly whose operational behaviour is more robust to compression experienced in the valve assembly, such that predictability of valve performance may be improved.

THE INVENTION

The present invention provides a disc for use in a pneumatic valve, the disc comprising a body of flexible material and a stiffening insert of more rigid material, wherein the stiffening insert forms a closed loop structure that is at least partly covered by the flexible body, the flexible body comprising a sealing region outside of the loop structure of the insert and an actuation region inside the loop of the insert.

A disc in accordance with this invention has the advantage of increased predictability and reproducibility of behaviour when incorporated in a valve assembly. This renders the disc more suitable for mass production of valve assemblies, as is increasingly required for many applications. Improved consistency of behaviour of this disc results from the inclusion of the stiffening insert. This protects the inner actuation region in two ways. First, if the disc is sealing a bore then considerable longitudinal pressures may be experienced by the disc. The magnitude of these pressures obviously depends on the specifics of the application: the disc should seal against the maximum pressure of expected gas flow, which in turn determines how tightly the disc needs to be inserted into the bore. Typically, the sealing region of the disc may experience a longitudinal length reduction of up to 40% on insertion in the bore. Ideally, the insert is shaped so as to retain its rigidity under such pressures. These longitudinal pressures are therefore not transmitted past the stiffening insert, which therefore shields the actuation area from deformation. As such deformation is inherently unpredictable, it is advantageously avoided. Secondly, either longitudinal (resulting from sealing the disc in a bore) or transverse (resulting from clamping the periphery of the disc) compression causes flexible disc material to flow from the clamped or compressed area towards the free centre (the important actuation region). However, in the present invention, the stiffening insert acts as a barrier to material flow and the actuation region is protected from bowing or other deformation. This again results in a disc with more predictable and reproducible behaviour.

The insert will most likely have an annular construction, corresponding to a conventional circular disc. This is normally the easiest and cheapest shape to manufacture. In these cases the longitudinal compression referred to above will be radial.

Alternatively, but less commonly, the insert may have an elliptical, polygonal or regular curved polygonal shape. An elliptical shape may be advantageous in, for example, pneumatic logic elements when one dimension is required to be less for stacking purposes. A square disc could be easier to package in a moulding.

The insert preferably includes keying features, which are porous to uncured or molten flexible material, but are locked to it thereafter. This provides an alternative to use of a bonding agent to ensure that the insert and flexible body are joined satisfactorily in the finished disc. Essentially, as the flexible material cures or otherwise hardens it sets around the insert. Where the keying features are present there is now a reciprocating shape in the flexible material in which the keying features are snugly held. This close fit strongly inhibits movement or slippage of the insert and it is therefore securely held within the flexible material of the disc.

A bonding agent suffers from various disadvantages, which will be addressed in detail later: its use makes rubber disc manufacture less economic, it provides another potential for variation between different discs and it is not ideal for safety-critical applications as simple human error may make it more prone to failure.

The insert may be fabricated from a material selected from the group of: metal, high melting point plastic and high melting point plastic with fibre or bead filling. Metals and plastics can be machined or moulded respectively to the required shape of the insert. The use of a high melting point plastic (also referred to as a high temperature plastic) ensures that the material does not lose its structure as it is overmoulded during disc fabrication. The term "high melting point plastic" should be understood to mean a plastic that will not melt at temperatures reached during moulding of the material of the flexible body about the insert. Similarly, any metal used for the insert should also have a sufficiently high melting point that it does not soften during overmoulding.

The filling material referred to above may be glass or a mineral with a higher melting point than that of the plastic. This provides a threefold advantage. First, the glass or mineral fibres or beads provide a scaffold for the plastic material of the insert, thereby raising the melting point of the composite structure. Secondly, the composite will have increased resistance to compression over a long period of time, as experienced in a valve assembly, as glass has a smaller tendency than plastics to creep. Thirdly, the coefficient of thermal expansion of the composite structure is reduced, which allows increased tensioning of the material of the flexible across the insert by shrink wrapping.

It is in fact highly preferred that the flexible material of the body is tensioned across the insert. This further improves the predictability and reproducibility of the behaviour of the actuation region of the disc. The tension takes up any slack across the actuation region, with the result that its position and that of its sealing surface within the disc can be accurately controlled. Consequently therefore its behaviour with respect to pressure can be accurately and repeatably reproduced. This is very significantly more precise than achievable by discs fabricated in accordance with the prior art. In the absence of the stiffening insert and a method of deliberately tensioning the central actuation region across it, the tension of a prior art actuation region is unpredictable. This is to the extent that, when in a valve assembly, the central actuation region may be tensioned, or may be slack, and consequently affects valve behaviour. This lack of control increases unpredictability.

The flexible material of the body may be a rubber or a thermoplastic elastomer (TPE). If rubber, then it is preferably a silicone rubber, natural rubber, neoprene or nitrile rubber.

Typical materials employed for the flexible part of discs, such as the rubbers and TPEs referred to above, have a level of shrinkage of about 2-3% between moulding temperature and room temperature. The stiffening insert preferably has a lower coefficient of thermal expansion, with the result that it will not shrink anywhere near this amount as it cools. Accordingly, the insert may be shrink wrapped by the flexible material, with the result that the material is tensioned across the insert, as required for improved behavioural predictability.

The actuation region preferably comprises a central thicker region surrounded by an outer thinner region. The thinner region may be between 5 and 20% of the thickness of the thicker region, which may be a diaphragm suitable for sealing a seat within a valve. This is a further advantageous feature that may be included in discs according to the present invention that is only permitted as a result of the protection afforded by the stiffening insert. As the central actuation region is shielded from the effects of compression, the thinner region does not noticeably weaken the disc's structure. Advantageously though, it flexes more readily than the thicker diaphragm region, with the result that the diaphragm will remain substantially flat during axial displacement, as is necessary to seal and open a seat. This increases the effective area of the diaphragm. The effective area of a diaphragm is defined by the generated load (for sealing or actuating) divided by the driving pressure. Accordingly, a diaphragm with larger effective area may be driven at lower pressure or can generate more load for the same sized disc.

The diaphragm may have a sealing surface that is substantially level with a lower surface of the stiffening insert, or it may be raised above it. Such designs lend themselves to application in timing valves and proportional valves respectively. Alternatively, for other valve assembly designs, it may be advantageous to provide a sealing surface that is below the level of a lower surface of the stiffening insert.

Alternatively, the diaphragm may be suitable for use as an actuator to operate a device such as a lever or micro-switch. As will be apparent, the same valve behavioural consistency issues apply to this application of a diaphragm as apply to its application to sealing a seat.

The flexible body preferably also comprises a connecting skin extending between the actuation region and the sealing region and across the insert so as to provide a continuous unitary surface to the disc. The skin may extend across one of either an upper or lower surface of the insert or across both. Generally the disc is expected to be used to control gas flow by sealing against a bore. In the absence of the unitary surface covering, there is the potential for gas leakage through the interface between the flexible body and the insert and across the disc. This embodiment of the invention therefore avoids compromising the seal in this manner.

The disc may be designed for either typical sealing arrangement: the sealing region may be profiled so as to seal against a bore hole or suitably shaped for transverse clamping by valve assembly housing.

The flexible body may include at least one protruding ring located on at least one disc surface in line with the insert. Such a ring or rings can be advantageously used to take up tolerances in valve assemblies. A ring on one surface will maintain contact between that surface of the disc and an adjacent surface of the housing. This provides for a tighter control of distance between the opposite surface of the disc, which normally has the sealing face of the diaphragm, and a valve seat. The protruding ring may be a sealing bead, which additionally helps seal the disc surface against gas leakage. A combination of tolerance take up rings and sealing beads may be used on the disc surface or surfaces.

The flexible body may be adapted to locate an end portion of a spring. A spring is often used in a valve assembly to bias a diaphragm against a seat. An adaptation in the flexible body to locate the spring assists in the assembly of valves including such a spring, and in subsequently holding the spring in place. The adaptation may be in the form of a protrusion out of the surface of the flexible body, or a recess within it, sized to locate the spring.

In some designs the stiffening insert may not be totally encased by the flexible body, but may extend from it into the housing of a valve assembly.

In various alternative aspects, this invention relates to a valve, such as a servo or pilot-activated control valve or a proportional valve, incorporating a disc as described above. Such discs may be incorporated in timing valves that may be normally open, normally closed or neutral.

Furthermore, the disc can be effectively sealed in a plain bore and so other equipment may be sandwiched in the bore above or below it. This potentially allows straightforward construction of valve stacks, such as may be used in pneumatic logic elements.

In a further aspect, the present invention comprises a method of manufacturing a disc for use in a pneumatic valve, the method comprising the steps of:
 a) Locating a stiffening insert forming a closed loop structure in a cavity of a mould tool;
 b) Closing the cavity;
 c) Injecting a flexible material into the cavity; and
 d) Hardening the flexible material, thereby moulding it to the insert.

If the flexible material is rubber, the method comprises the additional step of pre-heating the mould tool, preferably to a temperature of between 100° C. and 250° C., and step (d) includes the step of curing the flexible material. It may additionally include the step of post-curing the rubber.

If the flexible material is a thermoplastic elastomer, the method includes the step of injecting the flexible material in a molten state and step (d) includes the process of cooling the flexible material.

In either case, the insert may be made of a plastic material that has a melting point above the temperatures encountered in the moulding process. It may advantageously be made of a material that has a lower coefficient of thermal expansion than the thermoplastic elastomer or the rubber.

Alternatively, the flexible material may be a silicone rubber that is provided in a liquid form in its uncured state and the method includes the step of injecting the liquid silicone into a pre-heated mould and step (d) includes the process of curing the flexible material.

Embodiments of the invention will now be described by way of example only and with reference to the accompanying drawings.

Figure 1:
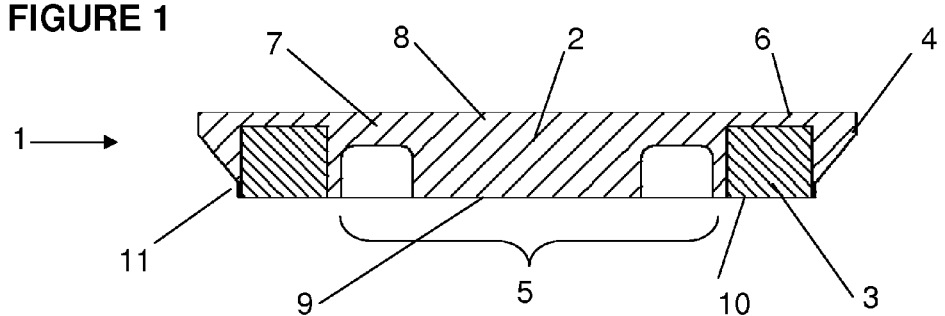
FIG. 1 is a schematic illustration, viewed in cross section, of a first embodiment of a disc for use in a pneumatic valve in accordance with this invention.
Figure 9:
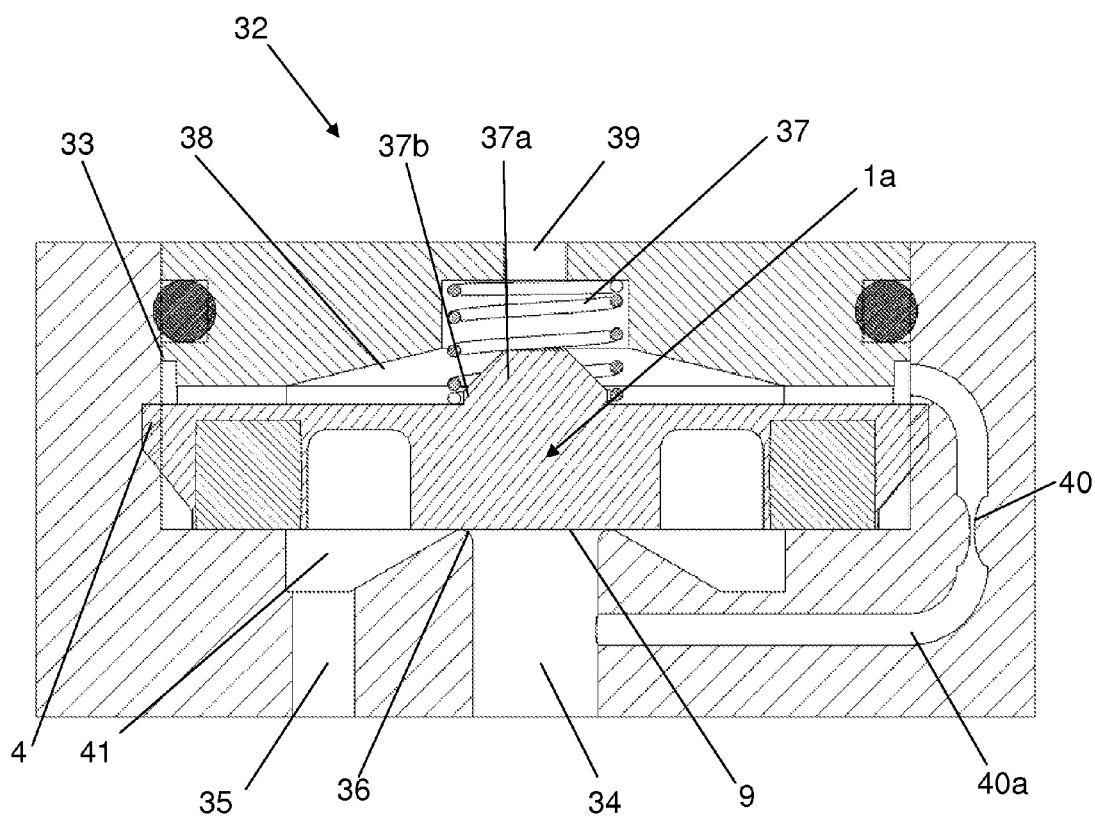
FIG. 9 is a schematic illustration of a valve assembly used to create a fixed pulse of gas, incorporating an embodiment of a disc in accordance with the present invention.
Figure 10:
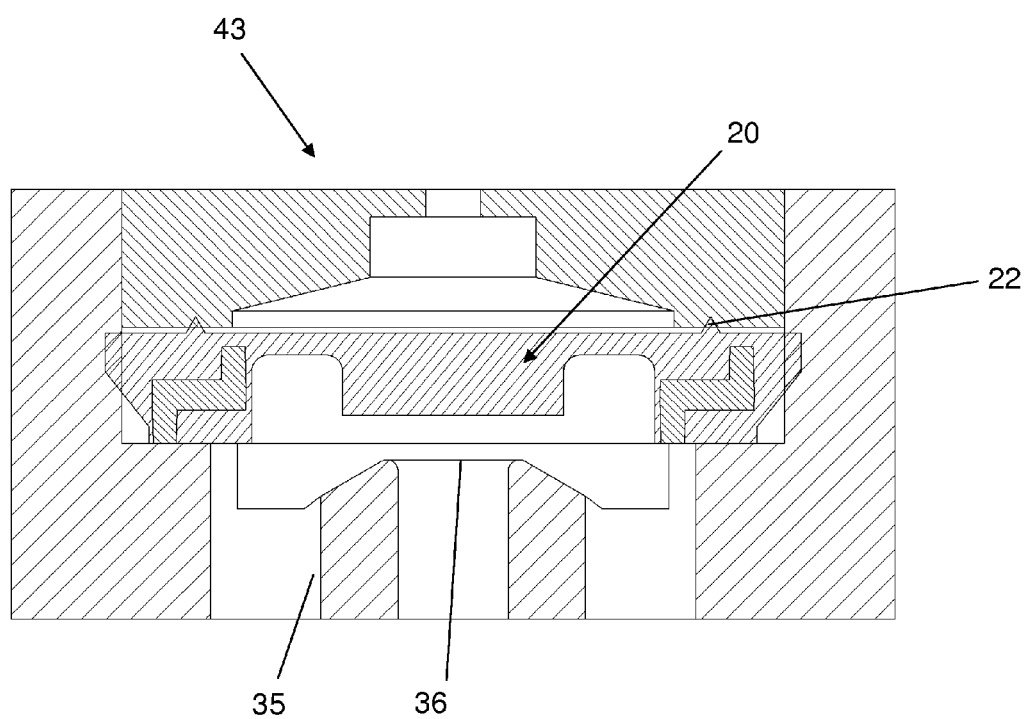
FIG. 10 is a schematic illustration of an assembly for a proportional type valve, incorporating an embodiment of a disc in accordance with the present invention.

With reference to FIG. 1 there is shown a cross section of a disc 1 for use in a pneumatic valve designed in accordance with the present invention. The disc 1 comprises a flexible body 2 of silicone rubber moulded over a stiffening ring 3 of a high melting-point plastic material such as polysulphone or polyphenylene sulphide (PPS). A bonding agent (not shown) provides adhesion between the ring 3 and the flexible body 2. The flexible body 2 comprises three functionally distinct regions 4, 5, 6, positioned about the stiffening ring 3. An outer sealing region 4 extends outside of the stiffening ring 3, and is suitably profiled for sealing against a bore hole. A central region 5, inside the stiffening ring 3, comprises a thin section 7 adjacent the ring and a thicker diaphragm section 8 at the centre. A lower surface of the diaphragm forms a sealing surface 9, which, as illustrated in FIGS. 9 and 10, may be employed to seal a seat or the like inside a valve assembly. A connecting skin 6 overlying the stiffening ring 3 ensures that the central 5 and sealing 4 regions are linked in a unitary construction.

The stiffening ring 3 is, in this embodiment, a solid circular ring. A circular disc 1 with circular ring 3 is expected to be the most common shape, but other embodiments are possible. The ring 3 material is, as noted above, a high temperature plastic such as polysulphone. The ring 3 can in fact be made of any stiff material and, preferably, is one which has a lower coefficient of thermal expansion than that of the material of the flexible body 2. It can therefore alternatively be a high melting point metal such as brass or a high temperature plastic with a filling of glass or mineral fibre or beads.

The outer sealing region 4 is designed to be compatible with constraints such as the construction of the valve assembly in which the disc is to be used and the manufacturing process of the disc itself. In particular, in rubber moulding, it is important to avoid the position of the flash (a very thin rubber extrusion into a gap between halves of a mould) crossing the sealing contact, which could cause a leak. The profile shown in FIG. 1 is suitable for insertion into a bore hole from the top. Alternative known sealing profiles can also be used. Essentially, the outer sealing region 4 is such that the outer diameter of the disc can seal in the internal diameter of a bore against the working pressure of the disc. Typically, depending on the application, a disc used in a pneumatic valve assembly should seal against a working pressure of 50-1000 kPa.

Once inserted in the bore hole of a valve assembly, the outer region 4 seals against the bore by interference. This results in a radial loading inwards on the disc 1. The stiffening ring 3 however is sufficiently rigid to inhibit transmission of these radial stresses inwards to the central region 5. In addition, the stiffening ring 3 presents a barrier to material flow within the flexible body 2 as a result of peripheral compression. Distortion and bowing of the diaphragm 8 are therefore substantially eliminated and the vertical position of the sealing surface 9 will remain accurately positioned relative to a lower face 10 of the stiffening ring, within the limits of disc manufacturing capabilities. Note that in this Figure the sealing surface 9 and lower face 10 of the stiffening ring are shown as being aligned to form a common surface. This is primarily as a result of the manufacturing method adopted, and it is not strictly necessary for the purpose of this invention.

The connecting skin 6 between the central region 5 and the outer sealing region 4 ensures that the flexible body 2 extends continuously across the bore in the valve assembly. In use, the operating gas in the valve assembly is often at high pressure and any path through a sealing disc 1, such as may be provided by the interface between the flexible body 2 and the stiffening ring 3, would permit gas to escape from one side of the disc to the other. That is, the seal provided by the outer region 4 would effectively leak. Ideally, the connecting skin 6 should be thin to limit flow of flexible material across the stiffening ring 3, which causes bowing. However the thickness must also be sufficient to cover the stiffening ring 3. A practical size is within the range of 5-20% of the total thickness of the disc.

Use of the stiffening ring 3 to protect the central region 5 from the effects of radial compression when the disc 1 is inserted in a bore of a valve assembly offers a further advantage to diaphragm construction. The thin section 7 of flexible material adjacent the stiffening ring 3 does not noticeably weaken the protected structure and it flexes more readily than the thicker diaphragm section 8. When the disc 1 is used in a valve assembly, driving gas pressure on the disc 1 will cause flexing of the diaphragm 8 as it is displaced axially in order to open and close a seat. With this advantageous design the majority of flexing will occur in the thin section 7 and the diaphragm section 8 will therefore remain substantially flat during axial displacement. That is, operation of the diaphragm 8 inside the valve assembly can be achieved with minimal distortion of its sealing surface 9. This effect can be achieved even with relatively small designed differences in thickness between the thin section 7 and the diaphragm 8. Typically the diaphragm 8 may be 1.5 to 5 times the thickness of the thin section 7, but this may vary depending on the specific application and other design variables.

A still further benefit to be gained from this design can be understood when considering the effective diameter of the central region 5 as it seals against a seat. The effective area of a diaphragm is defined by generated load, whether used for sealing or actuating, divided by applied pressure, with a value for the effective diameter derived from an assumed circular diaphragm. The larger therefore the effective area of a diaphragm, the greater the load that can be generated by the same gas pressure or the less gas that is needed to drive the switch. In a prior art design of disc, only by that part of a flexing diaphragm that is not bent or distorted contributes to its effective diameter. If a continuously thick disc were used therefore only a small central portion would correspond to the effective area as the flexing would be distributed more extensively across the disc. In general, the effective area of a uniformly thick diaphragm is between a quarter and a half of its total area. By way of contrast, with this current design the effective diameter is approximately the average of the inside and outside diameters of the thin section 7. This is accordingly a larger effective area than if a uniform thickness were extended across the whole disc inside the stiffening ring 3.

In some applications however it will be preferable to compromise the smaller effective diameter for overall disc strength. For example, if operating in environments in which the pressure across the disc is likely to be high, or if only a small movement to open and close a seat is anticipated. In such cases, a flexible body 2 with uniform thickness may be preferred.

The flexible body 2 may be made of a rubber, such as silicone rubber, which is a mature technology and so with well characterised behaviour. Alternatively it may be a thermoplastic elastomer (TPE). In either case, the stiffening ring 3 is made of a stiffer material, typically one with elastic modulus greater than 500 N mm$^{-2}$, with a lower coefficient of thermal expansion.

During fabrication of the disc 1, which will be described in more detail later, the stiffening ring 3 is first located in a mould tool. To assist with accurate location, a locating diameter is present in the tool. The rubber or TPE is then injected into the mould around the ring 3. The mould is either preheated to a high temperature (rubber) or injected with a high temperature material (TPE). Typical materials employed as diaphragms for pneumatic valves, such as the rubbers and TPEs referred to above, have a level of shrinkage of about 2-3% between moulding temperature and room temperature. The stiffener 3, with its lower coefficient of thermal expansion, will not shrink to this extent with the result that the cooled flexible body 2 will be tensioned across the stiffening ring 3. As a result of this tensioning, the position of the diaphragm 8 within the disc and its behaviour with respect to pressure can be accurately and repeatably reproduced in a multiple disc manufacturing process. This is very significantly more precise than valve assembly methods described in the prior art will allow. In prior art disc manufacturing processes, without a stiffening ring, the tension in the diaphragm cannot be controlled, with the result that in a valve assembly, the diaphragm may be tensioned, or may be slack. This cannot be known in advance, which gives rise to unpredictable behaviour.

The locating diameter on the mould tool is reproduced as an edge 11 on the disc, as the material of the flexible body 2 fills the tool.

Figure 2:
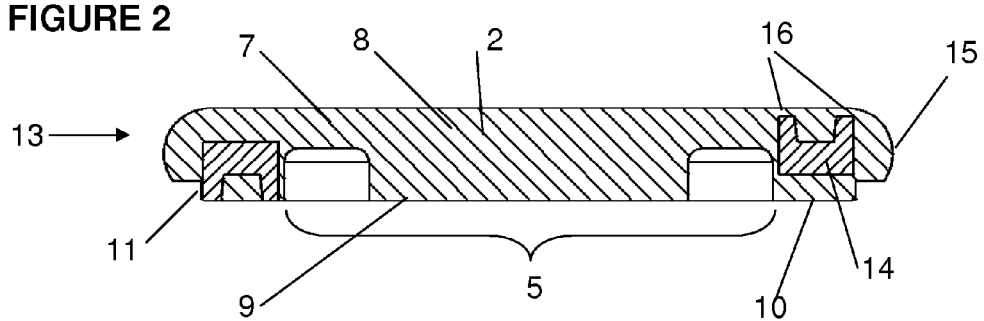
FIG. 2 illustrates schematically a second embodiment of a disc, viewed in cross section, in accordance with this invention that is suitable for use in pneumatic valves.

Turning now to FIG. 2, there is shown in cross section an alternative embodiment of disc 13 suitable for use in pneumatic valves. Components common to the valve design of FIG. 1 are like referenced.

The flexible body 2 of this embodiment of the disc 13 is moulded over a stiffening ring 14 of a glass-filled polysulphone. The central region 5, inside the stiffening ring 14, as for the previous embodiment, comprises the thin outer section 7, which preferentially flexes, and thicker diaphragm 8, which incorporates the sealing surface 9. An outer sealing region 15 extends outside of the stiffening ring 14 and is profiled for sealing against a bore hole. Direct sealing in a bore hole, for which both this and the previous embodiment are designed, is normally the most compact and economical means of construction of a valve assembly. The difference between the profile of the sealing region 15 of FIG. 2 and that of FIG. 1 is in the means of insertion into a bore (sealing profile 15 is for insertion from below) and in the position of separation of the two parts of the mould tool used in their manufacture. For example, in the case of the disc 1 shown in FIG. 1, the tool can be split on the top face of the flexible body 2, and the stiffening ring 3 inserted into a lower mould cavity, with its lower side resting on the floor. The locating diameter (reproduced at edge 11) assists with location of the stiffening ring 14 in the tool. A connecting skin 16 is shaped differently in this embodiment 13, consequent to the alternative design of stiffening ring 14, but essentially remains overlying the stiffening ring 14 to ensure that the central 5 and sealing 15 regions are continuously formed in the flexible body 2. This avoids offering a pathway through the disc to gas whose flow it is controlling, or to gas used to drive a valve assembly in which it is employed, thereby reducing leakage.

Again, the glass-filled polysulphone material of the stiffening ring 14 has a lower coefficient of thermal expansion than the silicone rubber that forms the flexible body 2. Accordingly, during the disc 13 fabrication process, the central region 5 is stretched across the stiffening ring 14 as a result of shrinkage of the cooling rubber.

Accordingly, as before, many improvements over the prior art are apparent. The diaphragm 8 and thin sections 7 are isolated from the sealing loads on the outside diameter by the stiffening ring 14. Material migration to the central region 5 is inhibited by the ring 14. The behavioural predictability of disc 13 is improved by tensioning resulting from shrinkage.

Figure 3:
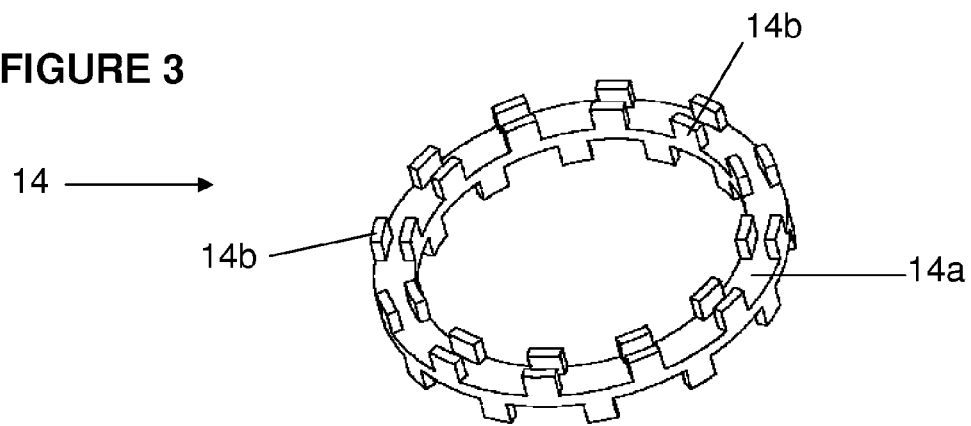
FIG. 3 illustrates a design of stiffening ring as used in the disc of FIG. 2.

With reference now to FIG. 3, a perspective view of the stiffening ring 14 of this embodiment 13 is shown. The ring 14 is not solid, but with a central annular portion 14a, with rectangular crenellations 14b aligned in inner and outer circumferential rings both above and below the annular portion 14a.

The stiffening ring 14 shown in FIG. 3 is superior to that used in the disc 1 of FIG. 1 in two respects. First in its structure and secondly in the material used for fabrication.

The moulding processes by which such discs 1, 13 are produced will be described in detail later. Essentially, the stiffening ring 3, 14 is located in a mould tool. The rubber or TPE that forms the flexible material is then injected and flows freely to adopt the shape of the mould cavity and to surround the ring 3, 14. Either the mould tool and/or the injected material is held at elevated temperature to allow injection and moulding. Thereafter the flexible material is cooled and set (TPE) or cured (rubber).

The ring 3 of FIG. 1 is a solid plastic ring that requires a bonding agent to ensure adhesion to the rubber (or TPE) of the flexible body 2. By way of contrast, the ring 14 of FIG. 3 includes features 14b that allow rubber or TPE to flow around them during the moulding process. Once the TPE is set or the rubber cured, the crenellations 14b will key to the solid flexible material of the disc. This design of stiffening ring 14 therefore avoids the need for bonding agents, which are disadvantageous in many situations.

In the first instance, the stiffening ring 3 of FIG. 1 is required to be coated with the bonding agent prior to insertion in the mould tool. In a rubber moulding process, the mould tool is held at approximately 200° C., at which temperature it takes only a few minutes for the bonding agent to break down and become ineffective. This severely limits the time for which the stiffening ring 3 can be retained in the tool, which in turn reduces the viability of mass production. A second disadvantage of the bonding agent, which applies to both rubber and TPE discs, is that it adds another potential for variation between discs made to the same design. Application of the bonding agent is a manual process, which tends to be a detailed and delicate operation. The difficulties are exacerbated by the small size of the stiffening ring, which is often around 8 mm inner diameter. With such a process, it is highly likely that variations are introduced between fabrications. Thirdly, in safety-critical applications it is preferable not to rely on bonding agents: operators may forget to apply them, or may become distracted and leave the coated ring in the mould tool for too long, with the result that the bond may fail in use.

The ring 14 of FIG. 3 is made of a high melting point plastic filled with glass fibres. It is important that the materials used are able to withstand the temperature of the moulding process without undue distortion. Glass is advantageously used as a filling as it not meltable at the mould production temperatures and raises the overall melting point of the filled plastic by providing a scaffolding within. In addition, it increases the ability of the ring 14 to resist compression over a long period of time (as encountered in a valve assembly), as glass has a far smaller tendency than plastics to creep. It also advantageously reduces the coefficient of thermal expansion of the composite structure. Alternative filling materials, with similar benefits, are glass beads or mineral fibres or beads.

Returning now to FIG. 2, it can be seen that with this design of stiffening ring 14 in the disc 13, the material of the flexible body 2 is formed about and fills gaps in the crenellations. This provides the capability for keying. The keying features, such as crenellations 14b, can be adapted either to the application i.e. use or design of valve assembly, or to make keying more effective. In considering intended application, it is vital to ensure that movement of flexible material from the outer sealing region 15 to the central region 5 as a result of sealing pressure is at an acceptable level. It naturally follows that a degree of bowing that may be acceptable in one application, cannot be tolerated in another, although in most applications the actual degree of material flow can be made negligible.

As previously indicated, the connecting skin 16 overlies and fills gaps in the crenellations 14b. It is to be noted that the skin 16 must cover either the upper or lower extent of the stiffening ring 14 in order to provide a fully sealing surface. For ease of manufacture the ring 14 rests on the bottom of the mould tool and the material of the flexible body is injected around it. This means that the lowest part of the ring (downward crenellations 14b) will naturally break the lower surface of the disc 13. It is important therefore to ensure that the upper surface of the flexible body 2 covers the uppermost point of the crenellations, which it does at the position of the connecting skin 16. Alternatively, the connecting skin 16 may extend both above and below the stiffening ring 14.

Figure 4:
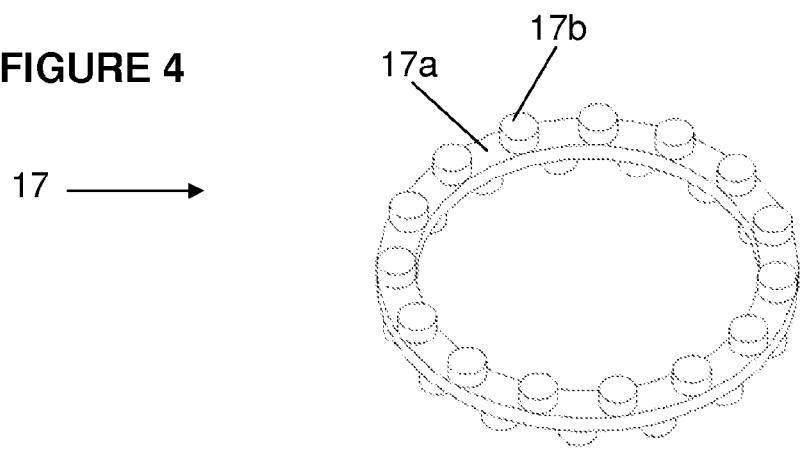
FIG. 4 illustrates an alternative design of stiffening ring, for use in the disc of FIG. 1 or 2.
Figure 5:
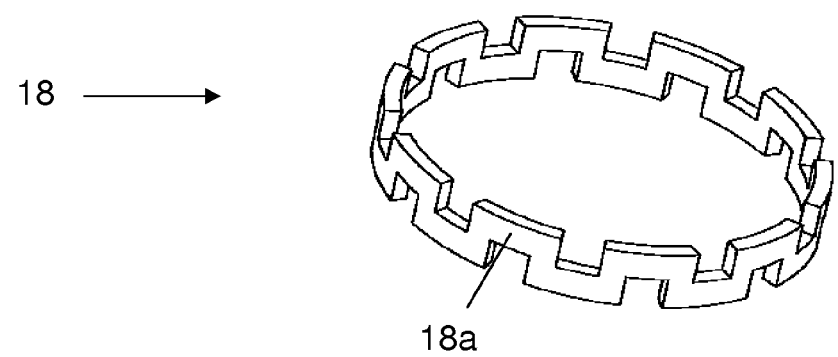
FIG. 5 illustrates a third embodiment of stiffening ring, for use in the disc of FIG. 1 or 2.
Figure 6:
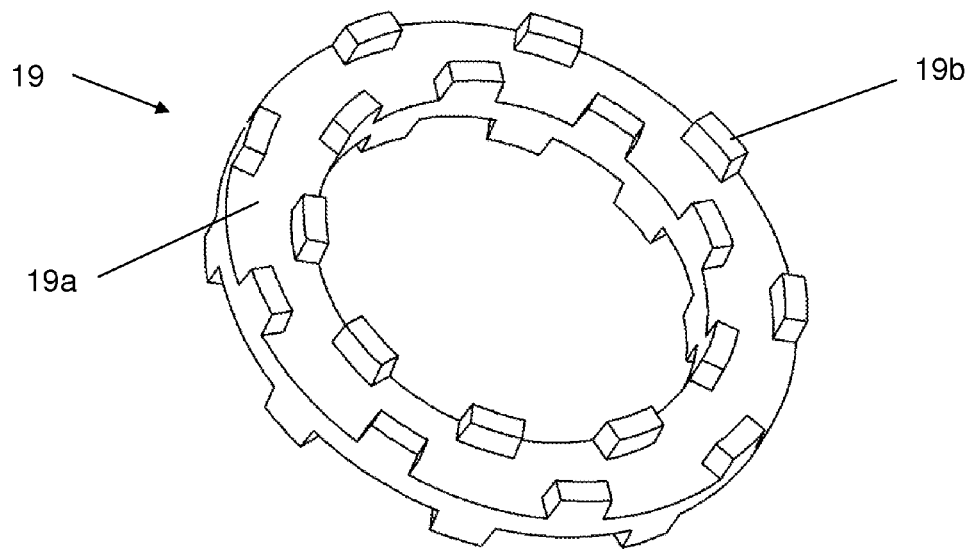
FIG. 6 illustrates fourth embodiment of stiffening ring, as used in the disc of FIG. 7.

With reference to FIGS. 4, 5 and 6 there are shown three further examples of stiffening rings 17, 18, 19 suitable for use in discs made in accordance with this invention. The ring 17 of FIG. 4 is moulded in a high temperature plastic material such as PPS and comprises a central annular portion 17a with cylindrical mountings 17b above and below. This design 17 is easier to fabricate than the embodiment 14 shown in FIG. 3, but has less effective keying. The ring 18 of FIG. 5 is constructed by pressing from sheet metal such as brass. This ring 18 comprises metal blocks 18a alternating above and below a central axis of an annular design. The ring 19 of FIG. 6, like that of FIG. 3, comprises a central annular portion 19a, with rectangular crenellations 19b in inner and outer circumferential alignment both above and below the annular portion 19a. In this embodiment 19, positions of the crenellations 19a in the inner and outer rings are respectively offset such that they do not align radially. This design 19 has been found to provide a good compromise between the various options: plenty of keying features and an ability to resist high radial load.

All the above examples of stiffening rings 14, 17, 18, 19 are designed so that they can be inserted either way up, still having a means of locating in a moulding tool, and having features that allow the rubber to flow through during moulding, and key to the rubber when cured. Of course it is not essential that the ring can be inserted either way up, but such symmetry makes it impossible for it to be inserted in a wrong way. This assists in disc fabrication by removing a possible source of operator error.

It is to be understood that the above described embodiments are examples only and many other designs of stiffening rings are possible, which would still provide the advantages of stiffening a disc in accordance with this invention. As a further example, a solid ring shape made of sintered beads, could be used, in which the rubber would penetrate into the interstices of the beads and key to the structure of the ring.

Figure 7:
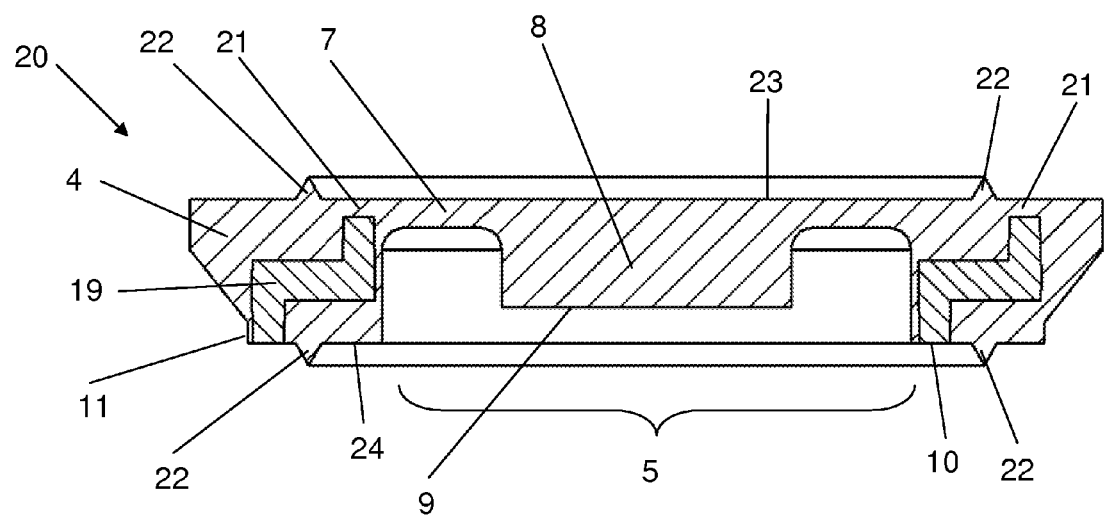
FIG. 7 illustrates schematically a third embodiment of a disc, viewed in cross section, in accordance with this invention.

An alternative design of disc 20 incorporating the stiffening ring 19 of FIG. 6 is shown in FIG. 7. Components common to the valve design of FIGS. 1 and 2 are like referenced. As before, the central region 5, inside the high temperature plastic stiffening ring 19 comprises the thin outer section 7, which preferentially flexes, and thicker diaphragm 8, which incorporates the sealing surface 9. An outer sealing region 4 extends outside of the stiffening ring 19 and is profiled for sealing against a bore hole. The locating edge 11 results from the assisted location of the stiffening ring 19 in a moulding tool. A connecting skin 21 is shaped about and above the stiffening ring 19 to ensure that the material of the central 5 and sealing 4 regions extends continuously across the flexible body 2, thereby preventing gas leakage.

The plastic material of the stiffening ring 19 has a lower coefficient of thermal expansion than the silicone rubber that forms the flexible body 2. Accordingly, during the disc 20 fabrication process, the central region 5 is stretched across the stiffening ring 19 as the rubber shrinks during cooling.

The diaphragm 8 and thin sections 7 are isolated from the sealing loads on the outside diameter by the stiffening ring 19. Material migration to the central region 5 is inhibited by the ring 19. The behavioural predictability of disc 20 is further improved by tensioning resulting from shrinkage.

This disc 20 differs from previous embodiments is that the sealing surface 9 of the diaphragm is not coplanar with the lower surface 10 of the stiffening ring 19 but raised above it. Such a design of disc 20 is suitable for incorporation in a proportional type valve in which partial opening and closure are required.

Alternatively, but not shown, the sealing surface 9 may be lowered below the lower surface 10 of the stiffening ring 19. The relative positions of these two surfaces 9,10 can be adjusted according to the needs of a specific design of valve assembly and the application to which it will be put.

A further difference in design shown in FIG. 7 is that the flexible body 2 of disc 20 includes two sealing beads 22 extending upwards and downwards respectively from the upper 23 and lower 24 disc surfaces, as compared with previous embodiments 1, 13. Each bead 22 is a ring moulded in the flexible body 2 in line with the stiffening ring. The sealing beads 22 assist in ensuring that a seal is formed by the upper 23 and lower 24 surfaces of the disc 20 as it is held in a valve assembly, preventing leakage of gas about the disc 20 within the assembly. In addition, the sealing beads 22 are used advantageously to take up tolerances such that the sealing surface 9 of a disc can be accurately positioned with respect to a seat of a valve assembly in which it operates. This will be explained in more detail with reference to FIG. 10 below.

Although in the above embodiments of discs 1, 13, 20, the flexible material is described as being of silicone rubber, it could alternatively be another rubber material, either natural or synthetic such as neoprene or nitrile rubber, or a thermoplastic elastomer. The rubber material of the flexible body may be reinforced with a fabric layer if the disc is required to withstand particularly high pressures. The material properties of TPEs are not so well understood as those of rubber, but they are beginning to be employed to form discs for use in valve applications. In particular, productions costs of TPE discs can be significantly less than those of rubber moulding.

Figure 8:
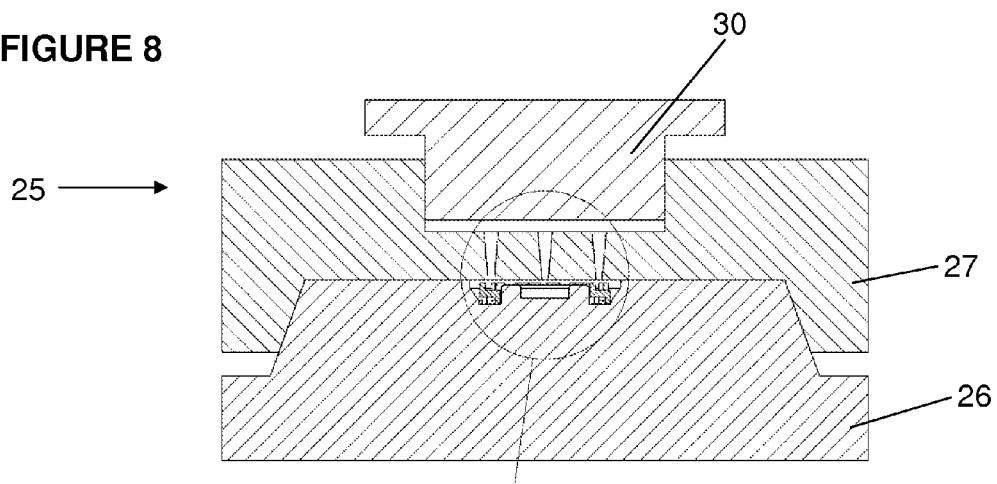
FIG. 8 is a cross-sectional view of a mould tool suitable for use in manufacturing a disc in accordance with a method of this invention.
Figure 8A:
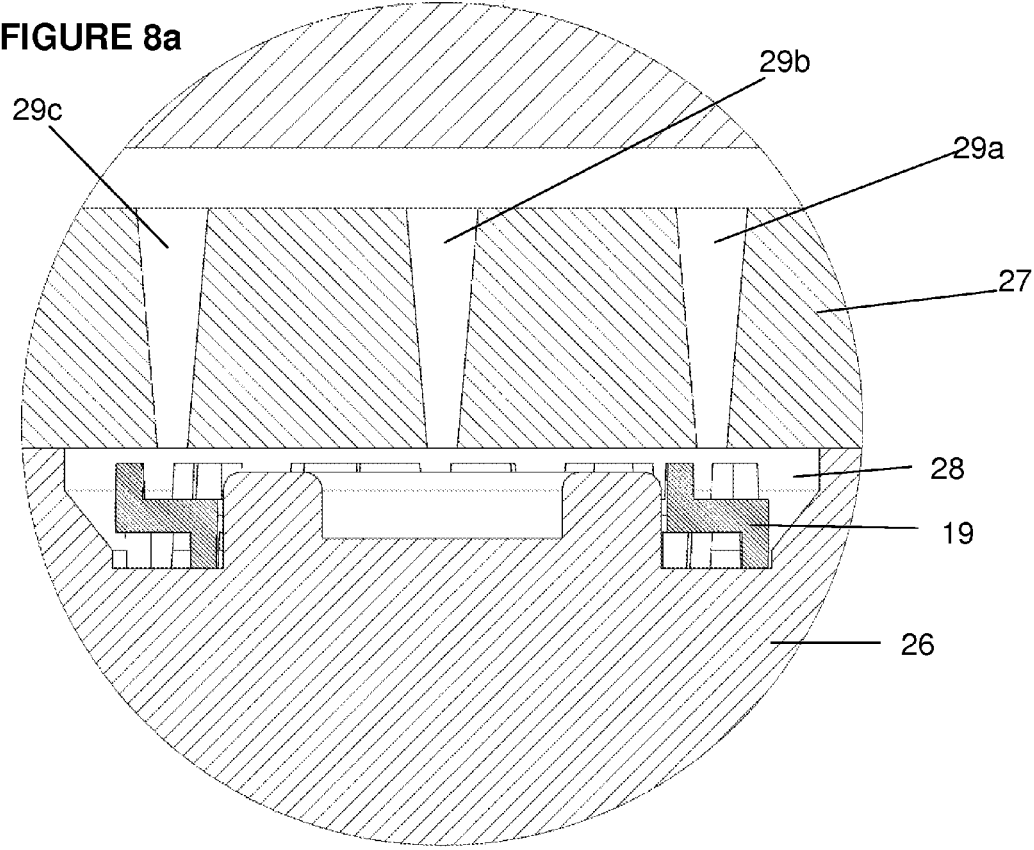
FIG. 8a is an enlarged portion of the mould tool of FIG. 8.

A process for fabricating discs in accordance with the present invention will now be described with reference to FIGS. 8 and 8a. In these figures there is shown a cavity 25 of a mould tool suitable for moulding a disc as described herein. FIG. 8a is an enlarged view of a central injection region of FIG. 8, showing more detail. A rubber mould tool comprises many, perhaps 50, such cavities, which will together be injected with rubber. Each cavity 25 comprises lower 26 and upper 27 metallic mould casings. In this embodiment, the lower casing 26 is cut with a hollow core 28 shaped to the moulding to be formed. Alternatively, the two halves 26, 27 of the moulding could be split at a different point requiring cores to be formed in the upper 27 casing only or in both 26, 27 casings. The hollow core 28 shown in this FIG. 8, 8a corresponds to the shape of the disc 20 of FIG. 7. The upper casing 27 includes injection gates 29a, b, c through which rubber may be forced by a piston 30.

In manufacturing rubber discs 20 in accordance with this invention, the tool is preheated to around 200° C., opened and stiffening rings 19 placed and located on the locating diameter in the lower mould casing 26 of each cavity. The piston 30 is removed and a ball of rubber placed above the injection gates 29a, b, c. The cavity is closed and uncured rubber is forced by the piston 30 through one or more injection gates 29a, 29b, 29c. The rubber rapidly fills the mould core 28, surrounding the pre-inserted stiffening ring 19. The position of the ring 19 is maintained during the process either by using only a central injection gate 29b or outer injection gates 29a, 29c located directly above the stiffening ring 19. In the first instance, the flow of rubber starts in the middle of the core 28, spreads outwards then flows over the part of the core that produces the thin sections 7 between the stiffening ring 19 and the diaphragm 8. Flow onto the stiffening ring 19 is therefore effectively from above, which holds the lower surfaces of the stiffening ring 19 in contact with the core floor and keeps the upper surfaces of the stiffening ring 19 away from the top face of the cavity. This prevents breaks forming in the flexible body, which could be responsible for leaks. In the second instance, the rubber is fed directly down onto the stiffening ring 19, with the same end effect of holding the ring 19 down on the floor of the tool. After about 30 s, the rubber will begin to cure. The rubber is cured for about 5 minutes to promote cross-linking. The tool is then opened and the disc can be removed from the mould. It may then undergo post-curing in an oven to complete the cross-linking process, the temperature and duration of this stage depending on the rubber being used.

The tool comprises a large number, 50 in this instance, of cavities. Economic manufacture of discs depends on the use of multiple pre-heated cavities at one time. If however a bonding agent has been added to the stiffening ring prior to its location in a tool, there is a time limit for which the ring can be left in a heated cavity without the bonding agent deteriorating. As it takes a significant time to load each ring, the number of cavities that may be used at one time is limited. In practice, this reduction in cavity numbers makes the part cost higher than if a bonding agent were not used. This then is the economic reason why alternative, keying stiffening rings are generally preferred.

A similar mould structure is used if the material of the flexible body 2 is to be TPE, although the process is somewhat different. The mould tool is held at room, or slightly elevated, temperature and the TPE is injected as a high temperature melt. The exact temperature used depends on the grade of TPE, but around 200° C. is likely to be typical. TPE cools to a hot and then cold solid, hardening and setting about the pre-inserted stiffening ring. The set disc can then be removed from the tool.

As is known in the art, silicone parts can also be moulded from silicone that is liquid in its uncured state. Discs in accordance with this invention can therefore also be fabricated from liquid silicone using known processing technology. The mould structure is again similar to that shown in FIG. 8, but the process is a hybrid of the two previously described. The tool is pre-heated as for silicone rubber, but curing is a faster process, reducing moulding times to the order to TPE mouldings.

With reference to FIG. 9, there is shown a valve 32 suitable for use in creating a fixed time pulse of gas, such as described in U.S. Pat. No. 6,484,721, that is modified to incorporate a disc manufactured in accordance with this invention. This is an example of a well known type of prior art valve that could be made smaller and more precise using the present invention. The following description is given to exemplify an application for the present invention.

The valve 32 includes a disc 1a, which is similar to the embodiment 1 shown in FIG. 1. The outer sealing region 4 of the disc 1a seals against an inside diameter 33 of a valve body.

The valve 32 has a gas inlet 34 and an outlet 35, the outlet 35 having a diameter that is smaller than that of the inlet 34. When the valve 32 is in an unpressurised state, the sealing surface 9 of the diaphragm 8 part of disc 1a is in contact with a seat 36. A spring 37 applies a load to the disc 1a, biasing the sealing surface 9 towards the seat 36. The spring 37 is designed with biasing force arranged such that a pressure that is significant part of the inlet pressure, say, 60% of the pressure at the inlet, is enough to move the sealing surface 9 away from the seat 36.

The disc 1a differs from that 1 shown in FIG. 1 in that it is adapted to engage the spring 37. The flexible body 2 of disc 1a includes a centrally located conical protrusion 37a extending upwards from its upper surface. At its root 37b, the protrusion 37a takes cylindrical form and has a diameter just smaller than the inside diameter of the spring 37. The protrusion 37a helps to locate the spring 37 as the valve is assembled and to maintain its position thereafter.

A chamber forming a control volume 38 is located above the disc 1a. An outlet 39 to the volume 38 may be open and so allow the control volume 38 to vent or it may be closed and so cause the control volume 38 to fill, via a restrictor 40 and passage 40a to gas inlet 34. When open, the control volume outlet 39 has to be large compared to the timing restrictor 40. The opening and closing of the outlet 39 is achieved by any conventional means.

With the outlet 39 closed, full supply pressure will build up in the control volume 38, pushing the sealing face 9 against the seat 36, closing the gas path between the valve inlet 34 and outlet 35.

When the control volume outlet 39 is open, the pressure in the control volume 38 will almost instantaneously fall to ambient. As the pressure in the control volume drops below that required to keep the sealing face 9 in contact with the seat 36, the sealing face 9 will move away from the seat 36. Pressure will build up in a chamber forming a flow volume 41, which, up to now, has been at ambient pressure. This will cause the valve 32 to open further rapidly. As the valve outlet 35 is smaller than the inlet 34, the pressure in the flow volume 41 will rise close to full supply pressure and the pressure under the central region 5 of the valve will push the sealing face 9 fully away from the seat 36.

The flow from the pressure supply through the valve outlet 35 is now metered by the orifice size of the outlet. Alternatively, this control could be achieved by a needle valve or selectable orifices (not shown).

From the moment the control volume outlet 39 is closed, the pressure in the control volume 38 will build up at a rate controlled by the sizes of the volume 38 itself and the restrictor 40. When the pressure builds up to a little below supply pressure, there will come a point at which the sealing surface 9 approaches close to the seat 36. At the moment that the effective (annular) open area between the seat 36 and the sealing surface 9 is close to the effective area of the valve outlet 35, the pressure in the flow chamber 41 will rapidly fall, effecting a rapid closure of the sealing surface 9 against the seat 36 and thereby closing the valve.

The disc 1a may have alternative adaptations to locate and hold the spring 37. The protrusion 37a may be shaped differently, all that is required is that it fits snugly within the spring 37 to hold it in place and does not hinder its flexing. It 37a may therefore be more fully conical or cylindrical. In an alternative design, a small wall with diameter slightly larger than that of the spring may protrude from the upper surface of the flexible body. The spring 37 is, in this design, held at its lower portion by the wall. Alternatively, the flexible body 2 of the disc 1a may include a recess to hold a lower end of the spring 37.

In some valve applications, the spring 37 may be dispensed with completely and the disc 1a replaced with the embodiment 1 shown in FIG. 1. In these applications, the seat 36 is positioned higher relative to the sealing surface 9 of the diaphragm 8 such that it presses against the diaphragm 8. Tension in the diaphragm material therefore supplies a force to bias the sealing surface 9 against the seat 36. Another alternative is to use a combination of spring 37 and diaphragm 8 material tension. In either case, the disc 1, 1a is biased against the seat 36. It is a further advantage of the present invention that use of diaphragm tension to provide a biasing force can now been done in a more precise manner than possible in the prior art. It is worth noting that the degree of interference between diaphragm and seat required to set the bias level can be of the order 0.2-0.5 mm for some applications. This is comparable to the magnitude of prior art diaphragm distortion that results from bowing. Accordingly it can be seen that discs according to this invention are particularly suited to valve applications in which a small, precise bias is required to be derived from diaphragm tension.

It is important to minimise any inconsistencies in disc 1, 1a design, as any variation will affect the pressure at which a valve incorporating the disc will close, and will therefore affect the duration of the pulse. As the closing point of the valve is in the asymptotic part of the pressure/time curve, at which point the pressure in the control chamber 38 is getting close to the supply pressure, small differences in the bias of the disc 1, 1a will result in relatively large variations in timing. Therefore the stiffening ring construction, which eliminates most of the variation in the disc bias, will allow a valve and the control volume to be made smaller for the same timing accuracy, or allow the same size valve to provide a more precise output.

There is an additional advantage for a conserver application. As the added precision in valve operation allows the control volume 38 to be reduced, the valve can be operated with a smaller amount of driving gas (usually oxygen that is being conserved) per pulse. As this amount of gas is expelled to the atmosphere when the control volume is vented, it is effectively wasted. Reduction of this wastage clearly improves the gas conservation of such a device.

FIG. 10 shows an alternative application for an embodiment of a disc 20 made in accordance with the present invention. The Figure shows a proportional control valve 43 in which a disc 20 with sealing beads 22 on its upper surface is incorporated. This valve 43 may be used to provide a large flow in response to the control of a small pilot flow. Such an application may, for example, be in the demand valve of EP 0606098 in which the pressure in a control volume is controlled by a diaphragm moving in response to a user's inhalation. As can be seen from FIG. 10, the valve structure is similar to the timing valve of FIG. 9 except the sealing surface 9 of the diaphragm 8 does not press against the seat 36, leaving the valve outlet 35 open.

The control volume 38 is located above the diaphragm 8. The upper sealing bead 22 is used to take up tolerances so that the bottom surface of the disc, next to the stiffening ring 19, is held in contact with a mating face 44 on the housing. This means that uncertainties in the distance between the sealing face 9 and the seat 36 of the valve assembly are minimised.

Alternatively, if precise distance control is required on the upper surface of the diaphragm, then a sealing bead 22 to take up tolerances would assist if provided on the lower surface of the disc.

In addition to taking up tolerances, the sealing beads 22 may provide their more conventional function and improve sealing capabilities of the disc. It is therefore possible to have a design of disc with three sealing beads to take up tolerance on one surface and one bead on the opposite side to provide a seal. However, in many valve designs the requirement for the sealing beads to actually provide a seal may be unnecessary. That is, sealing beads may be incorporated purely to take up tolerances and so to maintain contact between the disc and a surface of the housing. This results in tighter control of the distance between the sealing surface 9 of the diaphragm and the seat 36.

In an alternative design one or more sealing beads may be present on the valve assembly housing, rather than the disc.

In a further alternative, the stiffening ring may be attached to or form a part of the assembly housing. That is, the ring extends below (or above) the flexible body and so connects to both the disc and the housing.

Discs made in accordance with the present invention may be used in many other known applications and the same advantages arising from increased repeatability will be evident to those skilled in the art. The following are further examples of potential applications.

In one example the spring 37 of FIG. 9 is repositioned to be on the seat side of the disc, preferably located on a step around the seat. The sealing face 9 is then adapted with a protrusion, recess or the like to locate and hold the spring 37. The passage 40a below the restrictor 40 is vented to atmosphere instead of connected to the inlet 34. The control volume 38 could then be pressurised and the outlet 39 closed to produce a valve between inlet 34 and outlet 35 that will stay closed until the pressure in the control volume 38 has vented to a pressure below the valve's switching threshold.

In an example of an application requiring a precise means of actuating a micro-switch, the seat 36 is removed and an actuating rod extended from the sealing surface 9 of the diaphragm. The actuating rod is used to activate a micro-switch in response to pressure in the control volume 38.

In a further example, an application may require a signal in response to flow over a threshold. In this case, the restrictor 40 and its exit channel 40a are not present. Valve outlet 35 is set to function as an inlet and control volume outlet 39 is set as an outlet. A hole or holes are introduced to the thin section 7 of the disc in order to provide a flow path through the disc, between inlet 35 and outlet 39. Original valve inlet 34 is now a connector. An alternative flow path may be provided outside of the disc between inlet 35 and outlet 39, again including one or more holes. The area of the hole or holes is chosen to be sufficient to pass the maximum anticipated flow at a pressure drop acceptable for the application, but small enough to create a pressure drop of a level to move the diaphragm at the anticipated flow. The spring 37 is set to keep the sealing surface 9 in contact with the seat 36 until a pressure drop across the holes creates a force moving the sealing surface 9 away from the seat. This motion sends a pressure signal to the connector 34 to indicate that the flow through the assembly has risen above a threshold. The part dimensions and loads can be optimised to set the threshold to a desired level of flow.

In all the applications described, a disc made according to the present invention will allow one skilled in the art to reduce the size of a valve assembly incorporating the disc, for the same accuracy, or to improve its accuracy relative to size than is possible in the prior art.

The invention claimed is:

1. A disc for use in a pneumatic valve, the disc comprising a body of flexible material and a stiffening insert of more rigid material, wherein the stiffening insert forms a closed loop structure that is at least partly covered by the flexible body, the flexible body comprising:
    a sealing region outside of the loop structure of the insert and
    an actuation region, comprising a central diaphragm region surrounded by an outer flexing region, inside the loop of the insert,
    wherein the flexible material is continuous and unperforated across the central diaphragm region, thereby rendering the diaphragm region suitable for forming a pneumatic seal; and
    the flexible material of the body is tensioned across the insert such that, when the disc is subject to equal pressure on both sides, the diaphragm and flexing regions are aligned substantially parallel to a plane containing the closed loop structure formed by the insert.

2. A disc according to claim 1 wherein the insert has an annular construction.

3. A disc according to claim 1 wherein the insert includes keying features.

4. A disc according to claim 3 wherein the keying features are porous to uncured or molten flexible material, but are locked to it once the flexible material is cured or otherwise hardened.

5. A disc according to claim 1 wherein the insert is shaped so as to be substantially rigid under longitudinal pressures experienced when the disc effects a seal in a bore hole component of a pneumatic valve.

6. A disc according to claim 1 wherein the insert is fabricated from a material selected from the group of: metal, high melting point plastic and high melting point plastic with fibre or bead filling.

7. A disc according to claim 1 wherein the flexible material of the body (2) is a rubber or a thermoplastic elastomer.

8. A disc according to claim 1 wherein the flexible material is tensioned radially across the insert.

9. A disc according to claim 1 wherein the insert is of a material that has a lower coefficient of thermal expansion than the flexible material of the body.

10. A disc according to claim 9 wherein the insert is shrink wrapped by the flexible material.

11. A disc according to claim 1 wherein the diaphragm region is thicker than the flexing region.

12. A disc according to claim 11 wherein the flexing region is between 5 and 20% of the thickness of the diaphragm region.

13. A disc according to claim 12 wherein the diaphragm region is suitable for sealing a seat within a valve.

14. A disc according to claim 1 wherein the flexible body also comprises a connecting skin extending continuously across the disc, thereby providing a continuous unitary surface to the disc between the actuation region and the sealing region and across the insert.

15. A disc according to claim 14 wherein the skin extends across one of either an upper and lower surface of the insert.

16. A disc according to claim 1 wherein the flexible body is adapted to locate an end portion of a spring.

17. A disc according to claim 1 wherein the flexible body includes at least one protruding ring located on at least one disc surface in line with the insert.

18. A disc according to claim 1 wherein the stiffening insert extends from the flexible body into a valve assembly housing.

19. A valve incorporating a disc in accordance with claim 1.

20. A method of manufacturing a disc for use in a pneumatic valve, the method comprising the steps of:
    a. Locating a single stiffening insert forming a closed loop structure in a cavity of a mould tool, the cavity possessing structure internal to the location of the loop structure;
    b. Closing the cavity;
    c. Injecting a flexible material, having a higher coefficient of thermal expansion than the insert, into the cavity; and
    d. Hardening the flexible material, thereby moulding it to the insert and to the cavity structure to define a continuous, unperforated central diaphragm region of flexible material and outer flexing region; and
    e. Cooling the moulded insert and flexible material whereby the flexible material shrinks to a greater degree than the insert, causing it to become tensioned about the insert such that it adopts a substantially planar orientation within the loop of the insert.

21. A disc for use in a pneumatic valve, the disc comprising a body of flexible material and a stiffening insert of more rigid material that has a lower coefficient of thermal expansion than the flexible material of the body, wherein the stiffening insert forms a closed loop structure that is at least partly covered by the flexible body, the flexible body comprising a sealing region outside of the loop structure of the insert and an insert-free actuation region, comprising a central diaphragm region surrounded by an outer flexing region, inside the loop of the insert and wherein the flexible material of the body is tensioned radially across the insert such that, when the disc is subject to equal pressure on both sides, the diaphragm and flexing regions are aligned substantially parallel to a plane containing the closed loop structure formed by the insert.

22. A disc according to claim 21 wherein the insert is shrink wrapped by the flexible material.

23. A pneumatic valve comprising a bore hole within a valve body, a disc that is fitted within the bore hole such that its outer perimeter seals the bore hole by interference against an inside diameter thereof, the disc being arranged to open and close a valve seat and thereby control gas flow from a gas inlet to a gas outlet within the sealed bore hole; and wherein the disc comprises:
    a body of flexible material and a stiffening insert of more rigid material, wherein the stiffening insert forms a closed loop structure that is at least partly covered by the flexible body and wherein compressive force between the bore hole and the disc acts radially across the closed loop structure, the flexible body comprising:
- a sealing region outside of the loop structure of the insert and which seals against the bore hole; and
- an actuation region, comprising a central diaphragm region surrounded by an outer flexing region, inside the loop of the insert, wherein
- the flexible material is continuous and unperforated across the central diaphragm region; and wherein the diaphragm region forms a seal against the valve seat, when urged into contact therewith; and flexing of the flexing region moves the diaphragm region towards and away from the valve seat, thereby causing it to close and open.

24. A pneumatic valve according to claim 23 wherein the flexible material of the body of the disc is tensioned across the insert such that, when the internal valve pressure is equal on both sides of the disc, the diaphragm and flexing regions are aligned substantially parallel to a plane containing the closed loop structure formed by the insert.

* * * * *